(12) United States Patent
Tappan et al.

(10) Patent No.: US 6,899,263 B2
(45) Date of Patent: May 31, 2005

(54) AUGER WELDER STATION AND METHOD

(75) Inventors: Michael Sean Tappan, Pawnee, IL (US); Clinton Gene Barnhart, Mulberry Grove, IL (US); Jerry Lee Iams, Springfield, IL (US)

(73) Assignee: Illinois Department of Transportation, Springfield, IL (US)

( * ) Notice: Subject to any disclaimer, the term of this patent is extended or adjusted under 35 U.S.C. 154(b) by 38 days.

(21) Appl. No.: 10/315,447

(22) Filed: Dec. 10, 2002

(65) Prior Publication Data

US 2004/0108360 A1 Jun. 10, 2004

(51) Int. Cl.[7] ............................. B23P 6/00; B23K 1/14; B23K 37/04
(52) U.S. Cl. ...................... 228/49.1; 228/49.2; 29/429; 219/125.1
(58) Field of Search ........................ 228/47.1, 48, 49.1, 228/49.2; 29/888.01, 888.011, 897.1, 429; 219/76.14, 77, 124.34, 125.11

(56) References Cited

U.S. PATENT DOCUMENTS

| | | | | |
|---|---|---|---|---|
| 4,140,264 A | * | 2/1979 | Yago | 228/173.7 |
| 4,229,642 A | * | 10/1980 | Sakurai et al. | 219/125.1 |
| 4,333,001 A | * | 6/1982 | Nakahama et al. | 219/125.1 |
| 4,770,068 A | * | 9/1988 | Shaw et al. | 76/108.2 |
| 4,884,326 A | * | 12/1989 | Porter et al. | 29/889.1 |
| 4,904,840 A | * | 2/1990 | Fidelman | 219/124.34 |
| RE37,450 E | * | 11/2001 | Deken et al. | 175/62 |
| 2003/0095250 A1 | * | 5/2003 | Kitagawa et al. | 356/237.1 |

* cited by examiner

Primary Examiner—Lynne R. Edmondson
(74) Attorney, Agent, or Firm—Schiff Hardin LLP

(57) ABSTRACT

A repair station for a soil auger includes a frame on which the mount the auger at a working height and a motor and gear reduction system to rotate the auger. A slide bar is mounted parallel to the auger and carries a welding guide for supporting a welding gun. The welding guide includes portions engaging the blade, or flight, of the auger to move the welding guide axially of the auger as it rotates. The welding guide also includes a welding gun support shoe with a variable height to position the welding gun so as to lay a bead of metal on the edge of the auger blade. Repeated applications of the welding bead are performed to build up the blade from a worn state to a rebuilt state.

19 Claims, 3 Drawing Sheets

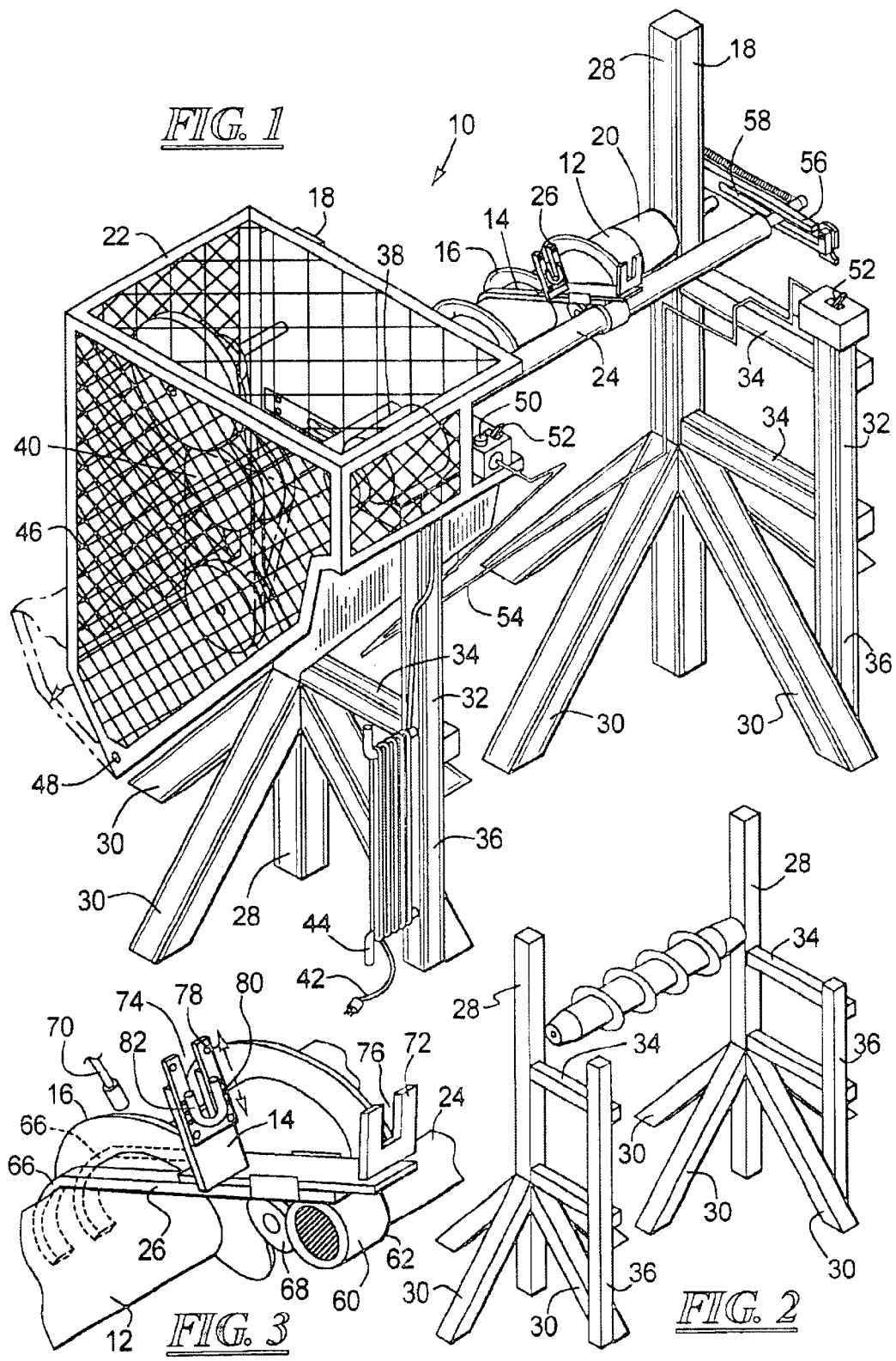

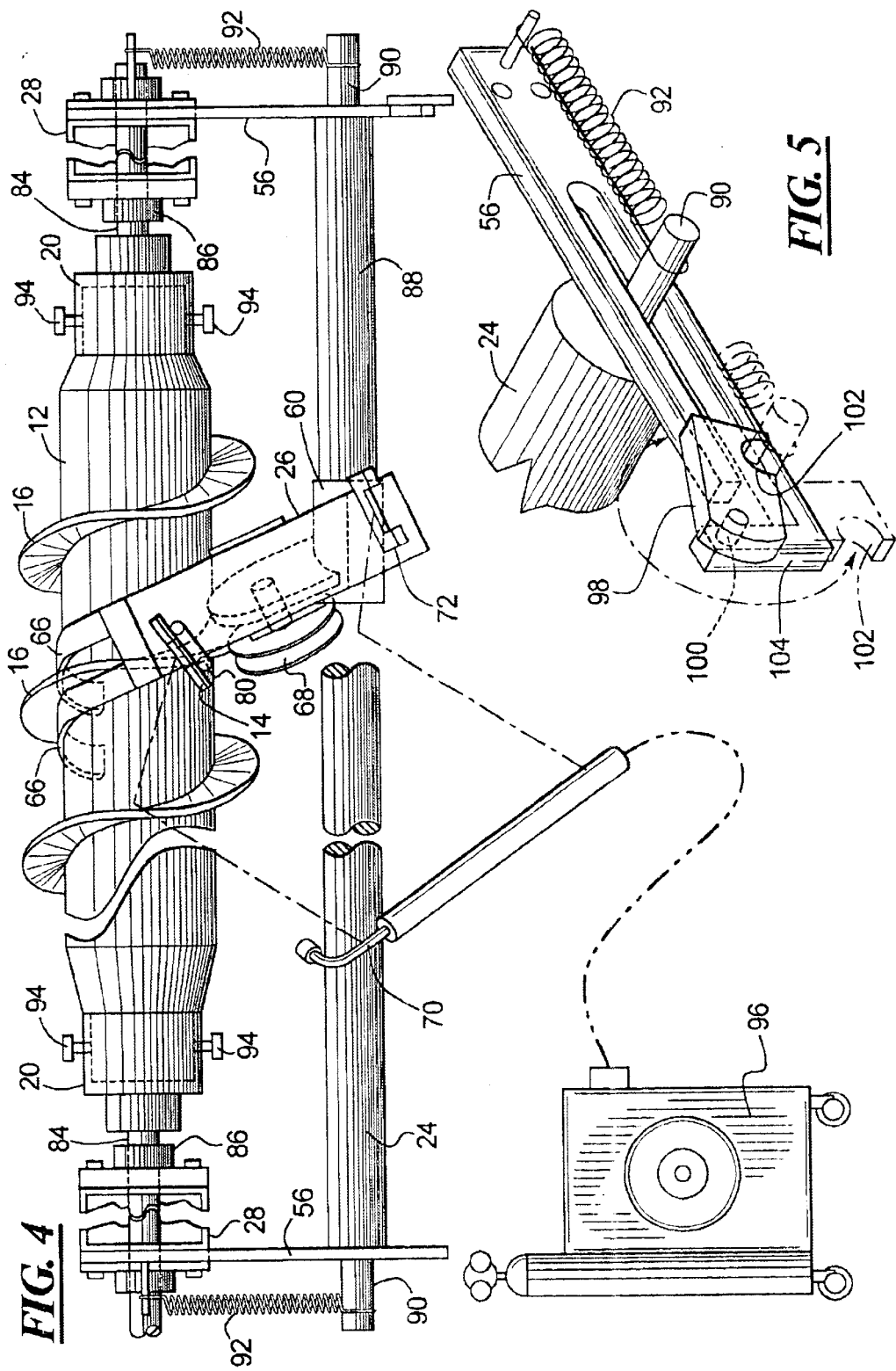

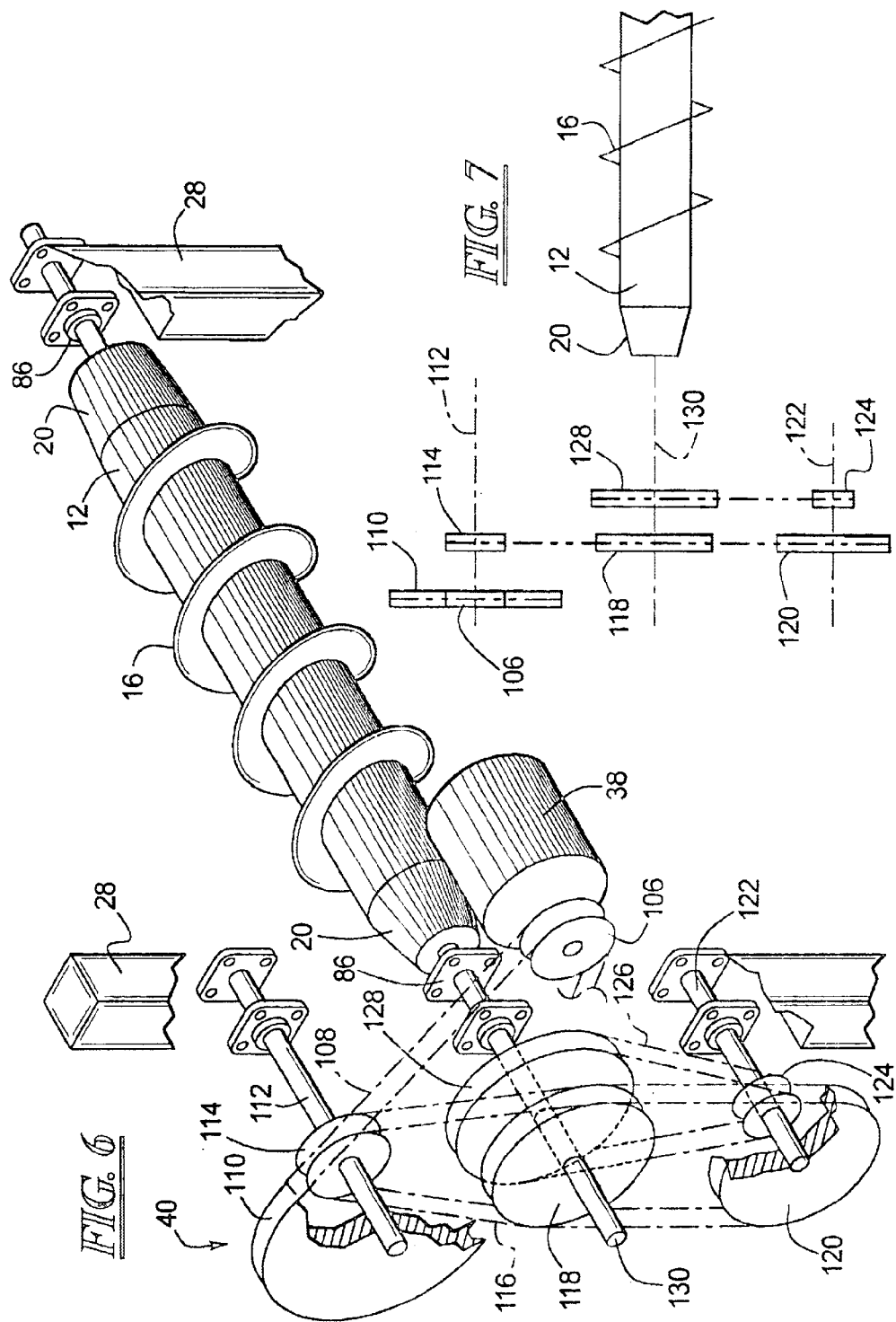

AUGER WELDER STATION AND METHOD

BACKGROUND OF THE INVENTION

1. Field of the Invention

The present invention relates generally to a welder station for auger repair and to a method for repairing augers.

2. Description of the Related Art

Soil boring is performed to obtain data on soil and rock for use in designing foundations for bridges, culverts, retaining walls and other structures as well as for support for pavements. Soil borings are accomplished by drilling an auger into the ground and performing tests on the soil and rock that is removed. The augers are tubes made of durable steel with a helical flight, or blade, on the outside surface. Machinery, that is generally operated by a drilling crew, is used to turn the auger as it is driven into the ground for obtaining the soil and rock samples. The abrasive action of the soil and rocks rapidly wears down the auger flight, making the auger less effective and putting stress on the drilling equipment.

As a result of the rapid auger wear, augers are replaced frequently. This practice becomes quite expensive, however. Attempts have been made to repair the worn augers, such attempts including welding steel onto the auger to reconstruct the flight or welding a bead onto the worn flight. Such work has been performed with the auger lying on the ground or floor with the welder operator bending over the auger. As the repair proceeds, the auger is rolled on the floor. This practice is unsafe in that it may lead to back injuries for the welder operator and potentially to burns for the welder operator and anyone who might contact the rolling hot auger. The resulting weld tends to be uneven, requiring grinding with hand tools for shaping the welded flight. The auger repair process is time consuming and inefficient.

SUMMARY OF THE INVENTION

An auger repair station and method is provided for repair of worn augers. The flight, or blade, of the auger is rebuilt using the present method and apparatus so that the auger's useful life is extended. The repair station includes a stand on which the auger is supported so as to be rotated about its axis. A drive rotates the auger during the repair operation. A welder guide is provided to move generally parallel to the auger and support a welding gun so that an operator can use the welding gun to lay down a bead of metal on the auger flight. Repeated applications of the bead may be performed as necessary to return the auger to a usable condition. The auger flight is thereby built up to enable continued use of the auger for soil drilling operations.

BRIEF DESCRIPTION OF THE DRAWINGS

FIG. 1 is a perspective view of an auger repair station according to the principles of the present invention;

FIG. 2 is a perspective view of only the stand and auger to illustrate the relationship therebetween;

FIG. 3 is an enlarged fragmentary view of the welder support portion of the present welder repair station;

FIG. 4 is an enlarged partial plan view of the auger under repair supported by end clamps and showing the welder support disposed alongside on a guide bar;

FIG. 5 is an enlarged perspective view of a guide bar slot for the guide bar;

FIG. 6 is a perspective view of the auger and drive system; and

FIG. 7 is a schematic side view of the drive system.

DETAILED DESCRIPTION OF THE PREFERRED EMBODIMENTS

The following descriptions set forth exemplary embodiments without limitation to the scope of the present invention.

Referring first to FIG. 1, an auger repair station 10 supports a soil auger 12 at a comfortable workbench level height and rotates the auger at a consistent, user variable speed. The repair station 10 includes a guide 14 to assist a welder operator in maintaining a proper welder gun position as the welder gun is moved over the rotating auger 12. The welder operator is able to form an even, symmetrical welding bead on the outside edge of the auger flight 16. Repeated applications of a welding bead to the auger flight 16 using the present auger repair station 10 results in an auger 12 which is returned to a usable condition.

The present auger repair station 10 provides, as its major system components, a stand having two stand uprights 18, auger couplers 20, which here are male and female couplers, mounted on the stand uprights 18 to support the auger 12 on the stand, a drive system 22 to rotate the auger 12, a guide bar 24 extending parallel with the auger 12 and providing sliding support for a welder support 26. The auger repair station 10 is shown in FIG. 1 from the side on which the welder operator stands to repair the auger.

In further detail, the two support sections 18, each of which include a vertical bar, or upright, 28 and four support legs 30 mounted at an angle to the vertical bar 28. A side support section 32 includes two horizontal members 34 extending generally perpendicular to the vertical bar 28 with a vertical side bar 36 mounted on the ends of the two horizontal members 34 and extending to the floor. The supports 18 are formed from steel bars, such as the hollow perforated steel bars typically used for sign posts, and are bolted and/or welded together for form the present structure. The materials of which the present support is formed are thus readily available, particularly to road departments and the like where the present invention would be used, and is relatively inexpensive to manufacture. The present support provides a strong and stable structure for holding the auger 12 during repair. Of course, other structures and arrangements are possible as supports for the auger, and such other structures are within the scope of the present invention.

The drive system 22 for rotating the auger 12 includes a motor 38 and a gear reduction arrangement 40 mounted on one of the support uprights 18. The motor 38 is an electric motor and is powered by connection to line power using an electric cord 42, shown wrapped on cord holders 44 on the side upright of the left support 18. The electric motor 38 transmits its rotational energy through the gear reduction arrangement 40 to reduce the rotational speed while increasing the torque. The gear reduction arrangement 40 includes, in the preferred embodiment, a belt and pulleys from the motor and gears and chains for further speed reduction.

The motor 38 and gear reduction arrangement 40 are covered by a protective cage 46 to prevent items, such as articles of clothing, from being caught in the gears and to prevent chains that may be thrown from the gears from causing damage or injury. The protective cage 46 is hinged on its lower portion 48 so that it may be moved to an open position for servicing of the motor 38 and gear reduction arrangement 40. The protective cage 46 has a steel frame and open mesh walls on the top, front, back and outside or left side wall. The cage has a solid plate steel wall on the bottom and on the inside or right side wall. The open mesh walls enables the user to visually inspect the condition of the gears and chains, whereas the solid wall to the left shields sparks from the welding operation away from the motor and gears and the solid wall on the bottom catches any oil or grease that may drip from the device.

The motor 38 is provided with a speed control 50 so that the user may set the speed of rotation of the auger 12. Motor kill switches 52 are also provided on both ends of the repair station 10 at easily accessed positions for added safety. The left (relative to the welder operator) motor kill switch 52 may be in the same box as the speed control 50. The right motor kill switch 52 is provided connected by a wire running 54 between the two support portions 18. In a preferred embodiment, the wire 54 between the support portions 18 is within a conduit that extends between the supports. To permit the support portions 18 to be moved closer or further apart to accommodate augers of different lengths and to permit mounting and un-mounting of the auger 12, the conduit 54 has a slip joint with an inner portion fitting in a sliding relationship inside an outer portion. The slip joint is formed by providing a ½ inch portion of conduit that fits in sliding relation into a ¾ inch portion of conduit. The wire is coiled into the conduit 54 to permit the movement of the support portions relative to one another without breakage of the wire. An industry standard provides that soil augers are five feet in length, and so as an alternative to the adjustable support, present device may be configured to accommodate only the standard length augers.

The auger 12 is held at its two opposite ends on the uprights of the support members 18 by the clamps 20 that engage the ends of the auger 12. The clamps 20 are mounted for rotation on the uprights 28 of the support members, such as by bearings, which enable the auger to rotate freely about its longitudinal axis. The gear reduction arrangement 40 is connected to the clamp 20 at the end of the auger 12 nearest the drive system 22 to rotate the auger.

The guide bar 24 is mounted on a guide bar support 56 extending perpendicularly from the upright member 28 so that the guide bar 24 is parallel to the auger 12. The guide bar 24 has the welder support 26 mounted thereon for sliding movement along the guide bar 24. The guide bar 24 of one embodiment is formed of 1½ inch diameter aluminum pipe. Welding splatter does not stick to the aluminum, so that the welder support 26 may slide along the guide bar 24 without problems. The welder support 26 engages the auger flight 16 and moves the welder support 26 along the guide bar 24 as the auger 12 is rotated. The welder support 26 maintains the welder in a fixed position relative to the outside edge of the auger flight 16 as the auger 12 rotates. A welder operator can thereby operate the welding apparatus and apply a bead of metal to the outside edge of the auger flight 16 to build up the auger flight by the height of the bead.

The guide bar support 56 has a slot 58 in which the end of the guide bar 24 is supported. The guide bar 24 is moved in the slot 58 to accommodate changes in the height of the auger flight 16. The guide bar 24 is held in the correct position by the tension spring. For example, a highly worn auger flight 16 requires that the welder support 26 and the guide bar 24 be positioned close to the axis of the auger 12, whereas a less worn auger flight 16 requires that the welder support 26 and the guide bar 24 be spaced farther away from the axis of the auger. Additionally, as the auger flight 16 is built up during the repair process, the guide bar 24 is moved farther away in the guide bar slot 58. Increasing or decreasing auger diameters are compensated by the tension in the tension springs on the guide bar.

In FIG. 2 is shown the supports 18 including the uprights 28 for each support and the legs 30 to maintain the uprights 28 in a stable position. The horizontal support section 34 for the support frame is shown as well. The auger 12 is held between the two support 18 sections by being clamped at the ends by the auger end clamps 20. The support sections 18 of the present embodiment are free standing with only a conduit extending therebetween, but they may be connected to one another by a fixed length or variable length brace, as desired. As a result of being free standing, the support sections 18 may be moved together or apart so accommodate augers of different lengths and to facilitate mounting of the auger in place on the support frame. This would also be true if they are connected to one another by a variable length brace between the support portions.

Although the present supports 18 permit the use of the present apparatus to repair augers of different lengths, the supports are generally maintained at a relatively constant spacing from one another for the majority of auger repairs, since the augers are typically of five feet in length according to an industry standard.

As can be seen from the drawings, the two support portions 18 are identical in construction. This avoids the necessity of manufacturing two different support for the support frame.

FIG. 3 shows the welder support 26 on the guide bar 24. The welder support 26 has a slide portion 60 mounted on the guide bar 24. In the illustrated embodiment, the slide portion 60 is a cylindrical sleeve mounted in sliding contact on the cylindrical guide bar 24. Other shapes of the guide bar and slide are of course possible and may include bearings or friction reducing materials. To permit easy movement of the slide portion 60 on the guide bar 24, the slide portion 60 of one embodiment has a hole 62 through the wall of the cylindrical sleeve for access to inside of the slide portion 60 so that a lubricant, such as graphite, may be provided between the slide portion 60 and the guide bar 24. The slide portion 60 of one embodiment is a 1¾ inch pipe section with end ring portions affixed at the opposite ends. The guide bar 24 is a 1½ inch aluminum pipe at its large diameter part.

On the slide 60 is provided the guide 26, also termed a flight guide. The flight guide 26 is an elongated flat metal member having its distal end split into two fingers 66 that are spaced from one another by a flight engaging gap. The fingers 66 are curved at the ends about a radius generally equal to the outside surface of the cylindrical auger body 12. The curve is formed at an angle to the elongated extent of the flight guide 26 generally corresponding to the angle of the flight 16 on the auger body 12. The fingers 66 are positioned on either side of the flight 16 and so assist in positioning of the welding guide to track the auger flight. The fingers 66 also shield the auger body from receiving sputtered material from the welding process and keep the added material where it is needed.

Below the flight guide 26 is a flight engaging roller 68 mounted for rotation on the slide 60. For example, the roller 68 is mounted on a bracket formed below the flight guide 26. The roller 68 has a circumferential channel formed in its outer surface of a size to engage an outer edge of the auger flight 16. In one embodiment, the flight engaging roller 68 is a pulley or like structure with its grooved rim engaged on the edge of the auger flight. It is also contemplated that the pulley can be replaced by rollers or wheels mounted to engage one or both sides of the auger flight to cause the welding guide to track the auger flight. The rollers may be mounted below the auger or may be provided on the fingers 66.

The roller 68 is mounted at an angle to the slide 60 corresponding generally to the angle of the flight 16 on the auger body 12. When the flight guide 26 is positioned with the fingers 66 on either side of the flight 16 and the roller 68 is engaging the edge of the flight 16, rotation of the auger 12 causes the flight guide 26 to move axially of the auger 12 and the slide 60 to move along the guide bar 24.

On the flight guide 26 is mounted a welder support or welder shoe 14. The welder shoe 14 of the illustrated embodiment is a front bracket for holding a welding gun 70. A back bracket 72 is also provided on the flight guide 26 as well. The front and back brackets 14 and 72 are mounted at an angle to the flight guide 26 so as to position the welding gun tip 70 at the top edge of the auger flight 16. In particular, the front bracket 14 has a vertical slot 74 into which a tip portion of the welding gun 70 is positioned and the back bracket 72 has a slot 76 into which the back of the welding gun 70 is positioned. The handle of the welding gun 70 is disposed between the front and back brackets 14 and 72. The front bracket 14 not only supports the welding gun 17 in position, but provides shielding for the welder operator's hands while holding the handle of the welding gun 70.

The front bracket 14 of the welding shoe has a vertically adjustable support 78 as indicated by the double arrow. The adjustable support 78 is a generally U-shaped member that is fastenable on the front bracket 14 in different vertical positions. The inside bottom edge of the U-shaped support 78 has a reinforcement 80 for added strength as well as wear and heat resistance. The support 78 is fasted to the front bracket 14 in any of several vertical positions by alignment of a vertical arrangement of holes 82 on both sides thereof and placement of bolts, screws, cotter pins, or the like through the holes 82. An accurate positioning of the welding gun tip 70 above the edge of the flight 16 is thereby possible.

Referring now to FIG. 4, the auger 12 is shown in greater detail, including its cylindrical outer surface with the helical flight 16 or blade extending therefrom. The auger 12 is held in the auger clamps 20 which are supported on rotation axles 84 supported in bearings 86, the bearings being mounted on the uprights 28 of the stand portions. The auger clamps 20 are fastened in place by bolts 94, although other fastening means may be provided instead. The guide bar 24 is supported in the guide bar supports 56 that are mounted on the uprights 28. The guide bar 24 has a larger diameter bearing surface 88 along most of its length and smaller diameter ends 90. The guide bar ends 90 rest in slots of the guide bar supports 56 and are prevented from endward movement by the larger diameter portion 88. A tension spring 92 is provided at each end 90 of the guide bar 24 to draw the guide bar 24 toward the auger 12. The tension spring 92 is fastened from the end 90 of the guide bar 24 outside of the guide bar supports 56 to the uprights 28 of the support frame.

The flight guide 26 is on the slide portion 60 with the fingers 66 on either side of the flight 16 and the flight engaging roller 68 in contact with the top edge of the flight 16. The tension springs 92 work to pull the flight engaging roller 68 into contact with the flight edge 16. The rotation of the auger 12 causes the flight 16 to move under the roller 68 so that the roller 68 rotates and drives the slide 60 along the slide bar 88. The fingers 66 keep the flight guide 26 in place during the movement, and in particular helps to keep the roller 68 on the flight 16.

The flight guide 26 must be moved out of the way during changing of the auger 12 and must be disengaged from the auger flight 16 when moved from one end of the auger to the other. This is accomplished in the present invention by rotation of the flight guide 26 about the guide bar 24. The guide bar 24 and the slider 60 are both circular in cross section so that relative rotation is easily accomplished. The flight guide is pivoted out of and into place as desired. The slider in this example performs two functions, namely sliding lengthwise of the auger and permitting rotation of the flight guide into and out of position. These two functions can be separated, for example, by providing a slider that only slides and that does not also rotate around the guide bar and by providing movement into and out of position for the flight guide by a hinge, for example, so that it can be pivoted relative to the slider to move the flight guide out of the way.

A typical welding gun 70 and welding apparatus 96 is shown in FIG. 4. The welding apparatus 96 is connected to the welding gun 70 so that welding gun 70 can be used to melt a bead of metal onto the edge of the flight 16. The welding apparatus 96 may supply an electrical voltage for arc welding to the welding gun, although other types of welding are within the scope of the present invention as well. The welding gun 70 is placed on the welder support shoe 14, as indicated by the broken lines, so that the welder operator can accurately place the bead on the flight edge. The flight guide 26 ensures that the welding gun 70 is held in the same position relative to the flight edge during the movement of the guide along the entire auger 12. The wire or rod material for forming the bead may be positioned manually, or the present auger repair apparatus can be used with a welding gun having a wire feed that feeds a metal wire to the welding tip to generate the wire bead. In a preferred embodiment, the welding gun includes a trigger activated wire feed so that the welder operator operates the trigger to apply the bead to the flight. The feed rate of the wire can be coordinated with the rotation rate of the auger 12 by an adjustment of the auger rotation speed control to facilitate the generation of an even bead on the flight edge.

In FIG. 5, the guide bar 24 is shown in the guide bar support 56 with the tension spring 92 attached at the end thereof. A latch 98 is provided at the free end of the guide bar support 56 that engages the end 90 of the guide bar 24 at a position away holding the guide bar, and thus the welding support 14, away from the auger 12. The latch 98 includes a pivot pin 100 about which the latch 98 is rotated and a slot 102 that is placed over the guide bar end 90 to hold the guide bar 24. The pivot pin 100 is provided on a vertical portion 104 of the guide bar support 56. The latch 98 keeps the guide bar 24 out of the way when replacing the auger 12, for example. The latch 98 is easily released by rotating to remove the guide bar end 90 from the slot 102, thereby permitting the guide bar 24 to be drawn toward the auger 12 by the spring 92.

FIG. 6 provides further detail on the drive system 40. The motor 38 of one embodiment is a $\frac{1}{16}^{th}$ horsepower alternating current electric motor providing 100 inch-pounds of torque and a maximum speed of 21 RPM. The motor 38 has a pulley 106 (2.5 inch diameter) on its drive shaft which drives a belt 108 connected to a larger (10 inch diameter) pulley 110. The larger pulley 110 is fixed to a shaft 112 mounted in the upright 28 which is also fixed to a small (3 inch diameter) gear 114. The small gear 114 engages a chain 116 that runs over an idler (7 inch diameter) gear 118 and to a driven (7 inch diameter) gear 120. The driven gear 120 is fixed to a further shaft 122 mounted in the upright that is also fixed to a further small (2.5 inch diameter) gear 124. The further small gear 124 has a chain 126 thereover that drives a further large (6 inch diameter) gear 128. The further large gear 128 is fixed to the shaft 130 that extends through the upright 128 to the auger coupling 20. Thus, aside from the motor 38, each of the gears and pulleys of the drive system are mounted on the single upright 28. The rotational speed of the motor is reduced by the arrangement of pulleys, belts, gears and chains to a speed conducive to welding of a bead on the flight edge.

In one example, the drive system 40 rotates the auger 12 within a range of ½ RPM to 1¾ RPM, as set by the operator using the variable speed control 50 (shown in FIG. 1). The speed range is used to coordinate the rotational speed of the auger with the feed rate of the wire welder to produce and even weld.

FIG. 7 further illustrates the arrangement of the gears and pulley of the drive system 40, so that their arrangement along the shafts is apparent.

The motor 38 that drives the drive arrangement is a variable speed electric motor, in a preferred embodiment, and thereby enables the user to set the rotation speed of the auger. Of course, other types of motors may be used. The present invention is of a broad enough scope to encompass other means of rotating the auger 12, such as by a hand crank or the like.

The auger 12 is turned by the drive system in the direction to move the top edge of the flight 16 away from the welder operator so that the bead of hot metal applied to the edge of the flight 16 moves away from the welder operator.

Using the present apparatus, the welder operator may lay down a bead of welded metal to the edge of the auger flight 16. The welded metal bead is provided by using a wire or welding rod during the welding operation. Preferably, a solid mild steel welding wire is used to build up the flight to the desired level and then a hard surface welding wire is used to produce the final bead, thereby increasing wear resistance of the flight 16.

According to the present process, the welder operator initiates rotation of the auger 12 on the support and begins welding a bead of metal on to the edge of the flight 16 at one end of the auger 12. Here, the operator starts at the left end of the auger as the operator faces the welding station. The rotation of the auger moves the flight guide 26 down the length of the auger 12 so that the bead is laid on the flight 16 along its length. In the illustrated embodiment, the auger is moved counterclockwise. Applications of further welding beads are repeated until the height of the flight 16 is returned to its original dimension, or at least until the height is greater than when the flight 16 is worn down. Due to the design, the ends of the auger receive more wear than the middle portion, and so it is generally necessary to apply more layers of metal beads on the flight 16 at the ends of the auger 12 than at the middle part. To accomplish this, the welder operator applies the bead only part way along the length of the auger 12 on at least one application, and preferably several applications.

The repair of the auger flight 16 is preferably performed before ½ inch is worn from the edge of the auger flight 16, since the application of ½ inch of material to the flight using welding wire is relatively easy. For highly worn portions of the flight or for damaged areas (such as cracked or bent portions of the flight), new sections of steel plate material may have to be welded in place. The present apparatus supports the auger 12 in a working position for such repairs. Bent auger flights are straightened and reworked back to their original shape. By straightening the flights, the roller 68 is prevented from getting stuck on severely bent flights. This more intensive repair is also facilitated by the present repair station, since the auger is held at a comfortable working height.

Inspection of the auger, both before the repair process is begun and during and after completion of the repair is facilitated by the present auger support. The auger may be rotated for inspection at a comfortable height. To facilitate the inspections, a template may be provided to check the flight diameter and/or spacing. The template is used repeatedly during the repair process to determine if the flight has been rebuilt to the desired height or whether further application of welding beads on the flight edge are necessary.

If the bead is applied in such as way that it is too wide or off center, it may be necessary to grind down, or grind off, the excess material. The present invention reduces the likelihood that extensive grinding will need to be done, because the welding gun 70 is guided at the proper position for welding an accurate, even and symmetrical bead all along the flight 16. For the safety of the personnel using the repaired auger, the surface of the repaired auger, and specifically the flight, may need to be ground smooth.

The auger 12 is mounted on the present apparatus by laying the auger 12 on the floor of the shop beside the repair station and attaching the end caps 12 to both ends. The support portion 18 that lacks the motor 38 and drive 40, and is thus easier to move, is moved away from the other support 18 by a short distance and first one end of the auger 12 and then the other is lifted to engage the end caps 20 on the rotation shafts 130. The support portion 18 is moved back into position. Marks may be provided on the shop floor to ensure alignment of the support portion 18 at the proper axial and radial position to prevent binding.

After repair of the auger 12 and preferably application of a hard surface wire bead to as the final bead, removal of the auger is accomplished by reversing the foregoing procedure.

Time spent for repair of the auger is reduced by the present invention. Repair of the damaged and worn augers 12 is safer. It be becomes easier to repair the worn or damaged auger with the present device, so that replacement costs are reduced. Further, the work crew using the auger is more likely to repair the auger 12 than to continue using a worn or damaged auger, so that the drilling equipment is subject to less stress and drilling operations are performed more quickly and efficiently.

Safety precautions are provided on the present auger repair station, including a kill switch 52 to halt operation of the device in the event of an emergency. The kill switch, or preferably, switches should be located in positions easily reached by the welder operator.

Thus, there is shown and described an auger welding station which permits easy repair of an auger so that the proper size and drilling efficiency is maintained. The present welding station 10 holds the auger 12 at a comfortable working height and permits the welder to apply an even symmetrical bead to the auger flight 16 to build it back up to its optimum operational dimensions.

The present auger repair station 10 can be built at a low cost, yet reduces or eliminates the need for purchase of new, costly augers. Not only are costs reduced, but down time of the geotechnical crew is reduced. Further, the auger repair is performed with greater safety and the repaired auger requires little or no grinding or supplemental shaping prior to use.

The present auger welding station 10 is safer, and more economical than prior solutions. Drilling efficiency is increased while keeping costs low and reducing stress on drill in equipment. The welds produced using the present apparatus are symmetrical and even, eliminating the need for grinding and shaping of the welded auger. The reduced time spent on repair of worn augers makes for more efficient use of personnel and reduced down time of the equipment.

Although other modifications and changes may be suggested by those skilled in the art, it is the intention of the inventors to embody within the patent warranted hereon all changes and modifications as reasonably and properly come within the scope of their contribution to the art.

We claim:

1. An apparatus for repairing an auger flight of an auger using a welding device, comprising:

a mounting frame supporting the auger in a substantially horizontal position and at work bench level;

a rotator drive on said mounting frame connected to rotate the auger about its longitudinal axis;

a guide support defining a support path substantially parallel to the auger when the auger is supported in said mounting frame; and a welder guide movable along said support path and guiding the welding device in a position to apply a welding bead to the auger flight as the auger is rotated by said rotator drive, said welder guide including at least one curved finger portion engaged on the auger body adjacent the auger flight.

2. An apparatus as claimed in claim 1, wherein said guide support includes a guide bar mounted on said mounting frame and extending substantially parallel to the auger when the auger is supported in said mounting frame.

3. An apparatus as claimed in claim 2, wherein said welder guide includes a slider mounted on said guide bar for sliding movement therealong.

4. An apparatus as claimed in claim 1, wherein said welder guide includes a wheel engaged against said auger flight.

5. An apparatus for preparing an auger flight of an auger using a welding device, comprising:

a mounting frame supporting the auger in a substantially horizontal position and at work bench level;

a rotator drive on said mounting frame connected to rotate the auger about its longitudinal axis;

a guide support defining a support path substantially parallel to the auger when the auger is supported in said mounting frame; and a welder guide movable along said support path and guiding the welding device in a position to apply a welding bead to the auger flight as the auger is rotated by said rotator drive, wherein said welder guide includes first and second fingers positioned on opposite sides of the auger flight.

6. An apparatus as claimed in claim 1, wherein said mounting frame includes first and second frame portions disposed at opposite ends of the auger, and further comprising:

auger clamps engaging the opposite ends of the auger to mount the auger on said first and second frame portions for rotational movement.

7. An apparatus as claimed in claim 1, wherein said welder guide includes:

an auger flight engaging portion to engage the auger flight during rotation of the auger by the rotator drive and maintain the welder guide in a relatively constant position relative to the auger flight; and a welding device support to engage the welding device during an application of the welding bead to the auger flight.

8. An apparatus as claimed in claim 1, wherein said rotator drive includes a variable speed motor and a speed reducing apparatus.

9. An apparatus for repairing an auger flight of an auger using a welding device, comprising:

a mounting frame supporting the auger in a horizontal position and at work-bench level;

end caps that mate at each end of the auger to attach the auger to said mounting frame;

a rotator drive mounted on said mounting frame and operable to rotate the auger when mounted on said mounting frame;

a slide bar oriented substantially parallel to the auger when the auger is mounted on the mounting frame;

a sleeve slidably mounted along said slide bar for movement substantially parallel to the auger;

a flight guide mounted on said sleeve and including two flanges defining a guided track between said two flanges, said two flanges being positionable so that auger flight is disposed in said guide track; and a welding support shoe mounted on said sleeve to support the welding device so that a bead may be welded onto the auger flight while the auger is rotated.

10. An apparatus as claimed in claim 9, further comprising:

at least one emergency kill switch operable to halt operation of said rotator drive.

11. An apparatus for repairing an auger flight of an auger using a welding device, comprising:

a mounting frame supporting the auger in a horizontal position and at work-bench level;

end caps that mate at each end of the auger to attach the auger to said mounting frame; a rotator drive mounted on said mounting frame and operable to rotate the auger when mounted on said mounting frame;

a slide bar oriented substantially parallel to the auger when the auger is mounted on the mounting frame;

a sleeve slidably mounted along said slide bar for movements substantially parallel to the auger;

a flight guide mounted on said sleeve and including two flanges defining a guided track between said two flanges, said two flanges being positionable so that auger flight is disposed in said guide track;

a welding support shoe mounted on said sleeve to support the welding device so that a bead may be welded onto the auger flight while the auger is rotated a safety cage encasing said rotator drive; and a welding spark shield mounted on said safety cage at at least a side thereof directed toward the auger.

12. An apparatus as claimed in claim 9, further comprising:

at least one roller mounted on said sleeve and engaged against the auger flight to cause the sleeve to move along said slide bar as the auger is rotated by said rotator drive.

13. An apparatus for repairing an auger flight of an auger using a welding device, comprising:

a mounting frame supporting the auger in a horizontal position and at work-bench level;

end caps that mate at each end of the auger to attach the auger to said mounting frame;

a rotator drive mounted on said mounting frame and operable to rotate the auger when mounted on said mounting frame;

a slide bar oriented substantially parallel to the auger when the auger is mounted on the mounting frame;

a sleeve slidably mounted along said slide bar for movement substantially parallel to the auger; disposed in said guide track; and a welding support shoe mounted on said sleeve to support the welding device so that a bead may be welded onto the auger flight while the auger is rotated, wherein said flight guide is mounted to be pivotable out of engagement with the auger flight.

14. An apparatus as claimed in claim 9, wherein said rotator drive is a variable speed drive.

15. An apparatus as claimed in claim 9, wherein said welding support shoe includes a front welding gun support and a rear welding gun support.

16. An apparatus as claimed in claim 15, wherein said front welding gun support is adjustable.

17. A method of repairing worn flights on an auger, comprising the steps of:

mounting the auger onto a mounting frame;

engaging the flight of the auger with a guide;

engaging a body of the auger on either side of the flight with said guide;

activating a drive so that the auger rotates in the mounting frame;

welding a bead of material onto the flight of the auger while using the guide to position a welding device relative to the flight as the auger rotates; and repeating said welding step as necessary until enough welding beads have been created to meet a predetermined flight diameter.

18. A method as claimed in claim 17, comprising the additional step of:

varying a rotational speed of the auger to match a desired rate of deposit of the bead.

19. An auger welding station, comprising:

a stand having first and second ends;

an auger mount at each of said first and second ends engageable to opposite ends of an auger, said auger mount mounting said auger for rotation about its axis;

a drive rotating the auger about its axis when the auger is mounted on said auger mount;

a welding guide having flight engaging portions and a welding gun holding portion; and two kill switches mounted at opposite ends of the workstation to halt operation of said drive.

* * * * *